United States Patent
Unterborn

[11] Patent Number: 5,219,049
[45] Date of Patent: Jun. 15, 1993

[54] ELECTRICALLY ACTUATED ELECTRIC BRAKE WITH ADJUSTER

[75] Inventor: Ralph J. Unterborn, Dayton, Ohio

[73] Assignee: General Motors Corporation, Detroit, Mich.

[21] Appl. No.: 720,087

[22] Filed: Jun. 24, 1991

[51] Int. Cl.⁵ .................................... F16D 65/34
[52] U.S. Cl. .................................. 188/156; 188/162; 188/325; 192/89 A; 192/93 A
[58] Field of Search ............... 188/156, 157, 158, 161, 188/162, 325, 327, 328, 326, 331, 332, 106 R, 106 A, 106 P; 192/89 A, 93 A

[56] References Cited

U.S. PATENT DOCUMENTS

| | | | |
|---|---|---|---|
| Re. 19,230 | 7/1934 | Apple | 188/162 X |
| 1,193,008 | 8/1916 | Fuller | 192/89 A X |
| 2,332,743 | 10/1943 | Morris | 192/89 A X |
| 4,596,316 | 6/1986 | Crossman | 188/158 X |
| 4,784,244 | 11/1988 | Carre et al. | 188/156 |
| 4,850,459 | 7/1989 | Johannesen et al. | 188/156 |
| 4,895,227 | 1/1990 | Grenier et al. | 188/156 X |

FOREIGN PATENT DOCUMENTS 704062 3/1941 Fed. Rep. of Germany ...... 188/158

Primary Examiner—Robert J. Oberleitner
Assistant Examiner—Peter M. Poon
Attorney, Agent, or Firm—Ernest E. Helms

[57] ABSTRACT

A vehicle brake having an electrically powered actuator and a parking brake is provided which, in a preferred embodiment, includes an electric motor with a rotor torsionally associated with the actuator for applying brake shoes, springs for returning the brake shoes to a released position, a first friction plate torsionally associated with the rotor, a second friction plate for selective mating with the first friction plate, torsionally fixed with respect to the rotor, a parking brake actuator, a parking brake shaft powered for rotation by the parking brake actuator, and a cam associated with at least one of the friction plates and the parking brake shaft whereby rotation of the parking shaft translates into relative motion between the friction plates to position the friction plates together to lock or release the vehicle brake.

4 Claims, 4 Drawing Sheets

ELECTRICALLY ACTUATED ELECTRIC BRAKE WITH ADJUSTER

FIELD ON THE INVENTION

The field of the present invention is that of a parking brake for an electrically actuated automotive brakes.

DISCLOSURE STATEMENT

It has come to pass in the pursuit of an improved vehicle brake, various electrically actuated brakes have been brought forth. Examples of such electrically actuated brakes are shown and described in commonly assigned U.S. Pat. No. 5,000,297 Shaw et al filed May 17, 1989 and Ser. No. 07/525,386 filed May 18, 1990, the disclosures of which are incorporated by reference herein.

SUMMARY OF THE INVENTION

The present invention provides an electrically actuated vehicle brake with an alternative parking brake mechanism than that described in the aforementioned disclosures. The present invention in a preferred embodiment is especially useful in an electrically actuated brakes in an electrically powered vehicle. In electrically powered vehicles there is a great desire to delete the fluid actuated braking system due to weight requirements of the vehicle.

It is an object of the present invention to provide an electrically actuated brake with a parking brake.

Other objects and advantages of the present invention can become more apparent to those skilled in the art as the nature of the invention is better understood from the accompanying drawing and a detailed description.

DETAILED DESCRIPTION OF THE DRAWINGS

Figure 1:
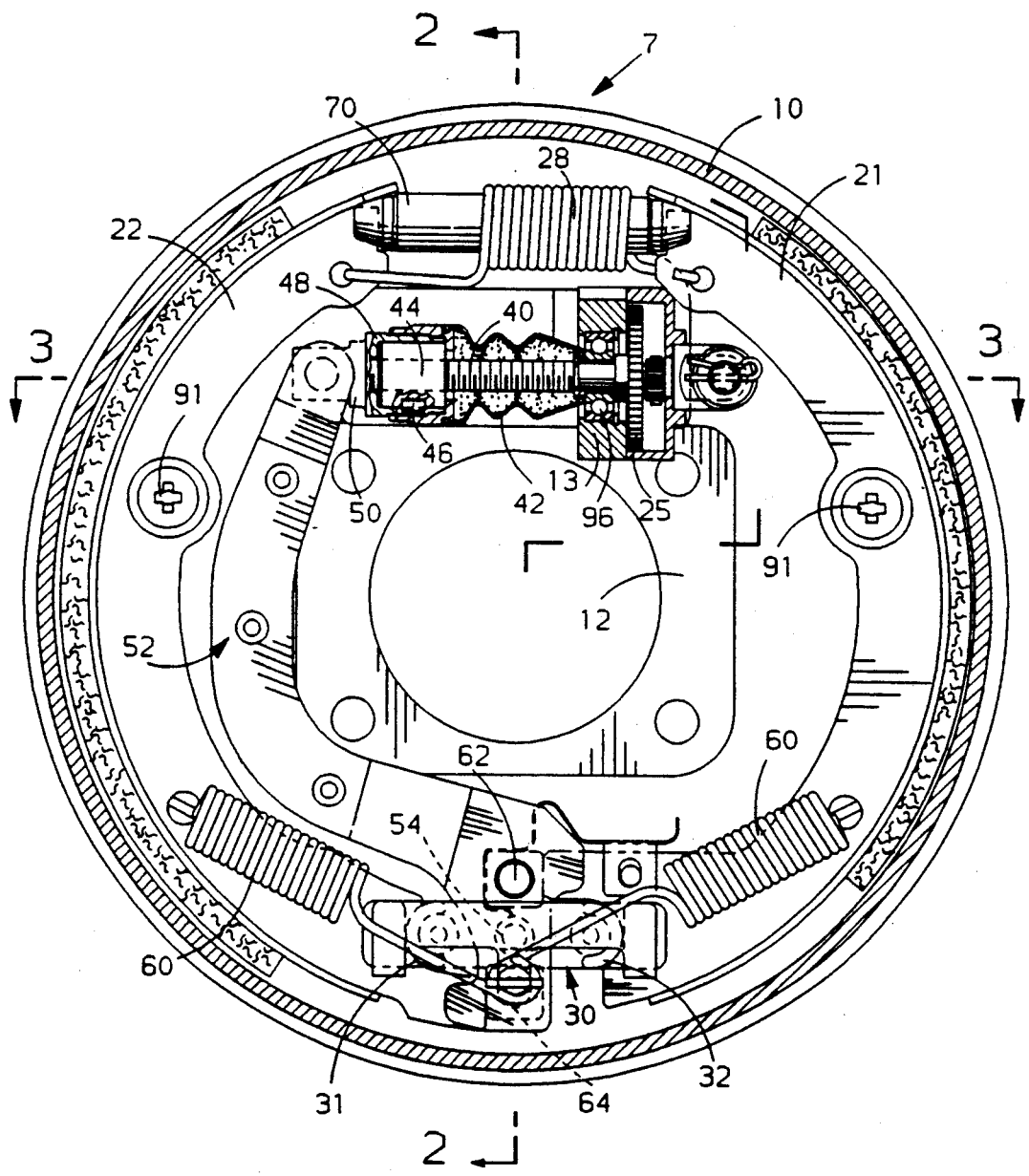
FIG. 1 is a front elevational view of a preferred embodiment vehicle brake of the present invention with portions therein section.
Figure 2:
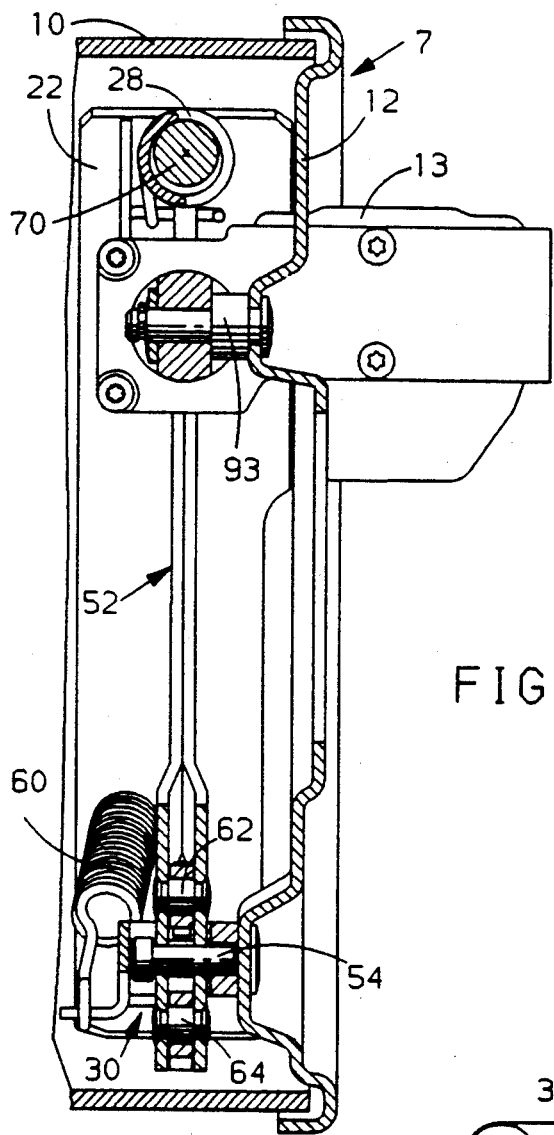
FIGS. 2 and 3 are section views taken from FIG. 1 along lines 2—2 and 3—3 respectively.

Referring to FIGS. 1-4 the drum brake assembly 7 of the present invention has a conventional brake drum 10 (an outline of which is shown) which is provided for connection to the vehicle wheel. Mounted to the vehicle is the backing plate 12 traditionally mounted to the axial housing. Mounted by spring loaded pins 91 to bias them towards the backing plate 12 are friction means secondary 22 and primary 21 brake shoes. A spring 28 holds the primary 21 and secondary 22 shoes together on the top against a stop 70. At their lower ends the primary 21 and secondary 22 shoes contact an anchor 30 with pins 31 and 32. The anchor 30 is fixed with respect to the backing plate 12. During brake actuation the primary 21 and secondary shoes 22 split apart from one another away from the bottom anchor 30.

Rotatively mounted to the backing plate 12 in position by a bearing 96 is a power screw 40. The power screw 40 is covered by a boot 42 and is threadably engaged with a non-rotative nut 44. The nut is keyed at 46 into a frame member 48 to prevent its rotation. The frame member 48 has an extension 50 (FIG. 1) which is pivotally connected to an apply lever 52. The apply lever 52 is of the shape of a bent arm and has a loss motion pivotal connection with the backing plate intermediate the two anchors pins 32 and 31 for the primary and secondary shoes via a pin 54.

Each brake shoe has a return spring 60 for returning that shoe towards the anchor 30. The apply lever has pivotal movement with respect to the shoes 21, 22 by the shoe actuators 62, 64 which contact portions of the shoes. Movement of the non-rotative nut 44 to the right, as shown in the drawings, will cause the lever 52 to rotate clockwise on the pin 54 causing the shoes 21, 22 to be contacted and separated in an outward direction. The return spring 60 will cause the shoes to return to the non-actuated position.

The actuator of the vehicle brake 7 includes the lever 52 non-rotative nut 44 drive screw 40 along with meshing gears 25, 24.

A housing or frame 13 is provided which mounts a brake actuating motor 71 to the backing plate 12. The motor 71 has a shaft and/or rotor 73 which has connected thereto a pinion 24. The pinion 24 and a large gear 25 form a gear train which torsionally connects rotor 73 with the power screw 40.

Connected on the opposite end of the rotor 73 is a first friction plate 15. The first friction plate has a friction surface 17 which faces away from the braking motor 71.

Biased towards the first friction plate 15 by a spring 33 is a second friction plate 19. The second friction plate 19 has a corresponding friction surface 23. When mated with the first friction plate friction surface 17 restrains the first friction plate 15 (and its torsionally associated rotor 73) from rotating. To provide torsional fixation of the second friction plate 19 with respect to the motor 71 the second friction plate has extending lugs 100 which nest in ears 29 of a part of the frame member 13.

Mounted in the frame 13 for rotation along a rotational axis coterminous with the rotational axis of the rotor 73 is a parking brake shaft 35. The parking brake shaft has along one of its ends a fixably connected sector gear 37. The sector gear is powered by a pinion gear 39 connected with a parking brake actuator motor 41.

The brake shaft 35 extends through a bore of the second friction plate 19. A retaining ring 59 in cooperation with a surrounding washer 57 prevent translational movement of the shaft 35 along its longitudinal axis.

Torsionally associated or fixably connected with the parking brake shaft 35 at its end generally opposite its connection with the sector gear 37 is a lifter or beta cam member 43 with a peak 61. The beta cam member peck 61 selectively mates with an alpha cam member 49 which is associated with the second friction plate 19.

Figure 4:
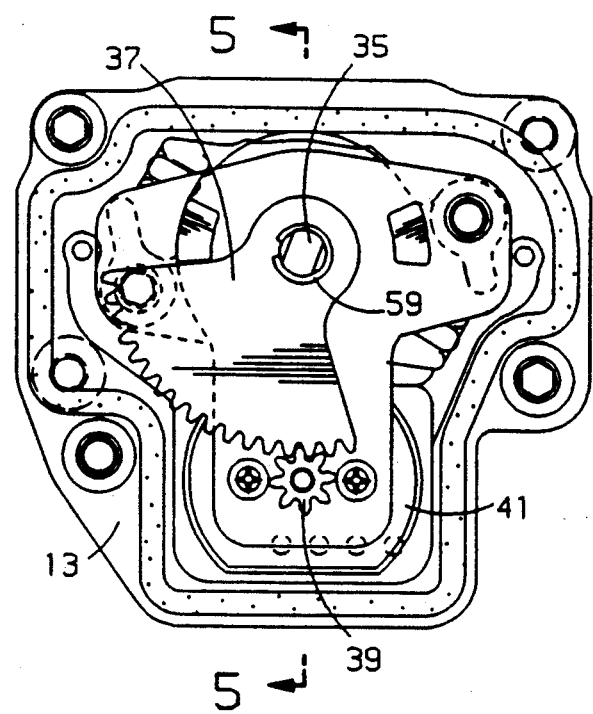
FIG. 4 is a sectional view taken along line 4—4 of FIG. 3.
Figure 3:
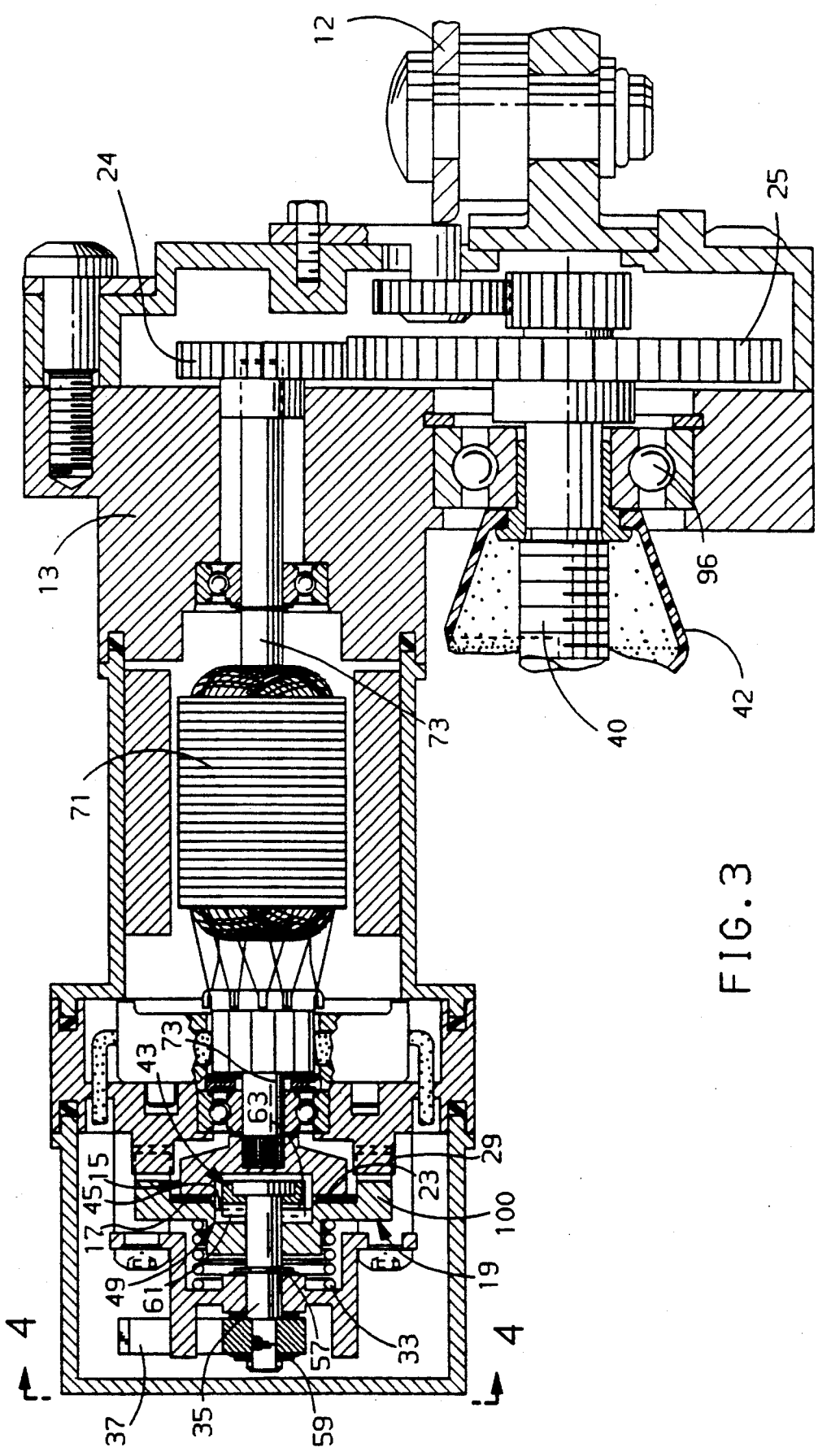
Figure 5:
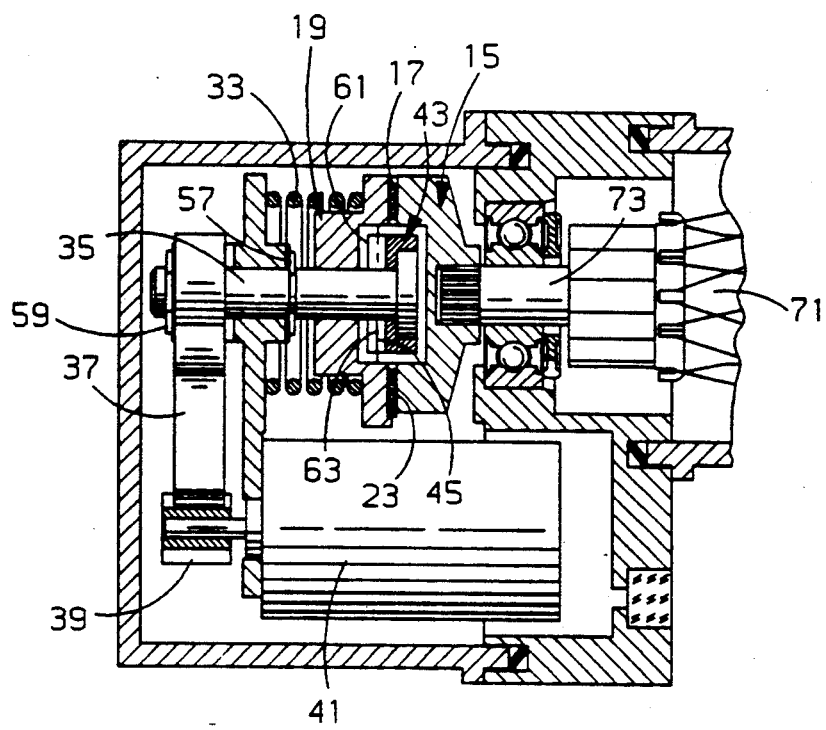
FIG. 5 is sectional view taken along line 5—5 of FIG. 4.

The alpha cam member 49 has a surface 45 with a peak 63 directed towards the beta cam member 43 (FIGS. 4 and 5).

Figure 6:
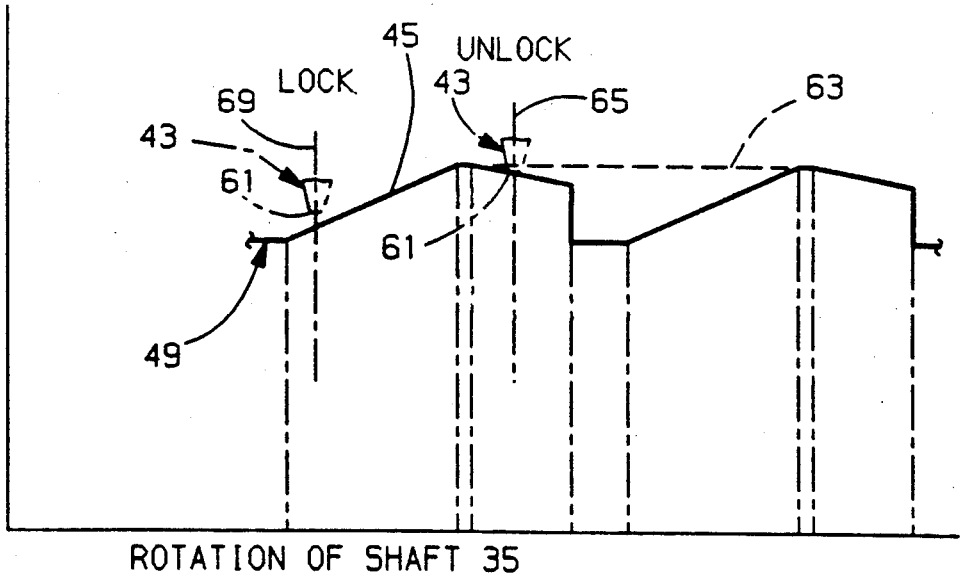
FIG. 6 is a rollout of cam displacement profile of mating cam faces.

In operation, activation of the parking brake will first cause the motor 71 to be signaled to actuate the brake shoes 21,22 outward. FIG. 6 illustrates relative displacement of the friction surface 23 from the friction surface 12 due to displacement of the shaft 35. Prior to being signaled into a parking brake activation mode, the shaft 35 is angularly located in a position 65 so that the cam peak 61 on the beta member 43 are positioning the alpha member 49 (FIG. 6) away from the motor 71. Therefore, the brake actuator motor 71 can move freely since the cam surface 45 is positioned by the cam peak 61 to create a separation of the second friction plate 19 from the first friction plate 15 against the biasing of the spring 33.

After the brake shoes 21,22 are actuated outwardly, the parking brake actuator motor 41 will then be signalled to turn the pinion gear 39. The pinion gear 39 powers the sector gear 37 to turn the parking brake shaft 35. The above torsional movement will cause the beta peak 61 to rotate to such a position 69 such that the clearance between the first 15 and second 19 friction plates will be eliminated and the spring 33 biasing of the second friction plate 19 will cause the second friction plate 19 to be urged forward and mate with the friction surfaces 23,17 therefore locking the position of the motor 71. Since the motor rotor 71 is now positionally locked the brakes cannot be released. Cam overlocking occurs since to get from a locked position 69 to an unlocked position 65 or vice versa a displacement of the angular location of the alpha cam member 49 must occur against the biasing of the spring 33. There does not need to be continual powering of the parking brake actuator motor 41 in either position 69 or 65.

While an embodiment of the present invention has been explained in the environment of an electrically powered vehicle drum brake, it will be readily apparent to those skilled in the art of the various modifications which can be made to the present invention and applications of the present invention in electrically powered caliper brake without departing from the spirit and scope of this application as it is encompassed by the following claims.

I claim:

1. A vehicle brake having an electrically powered actuator for moving a friction means into contact with a vehicle wheel, the brake also having a parking brake, the vehicle brake comprising:
   an electric motor with a rotor torsionally associated with the actuator to power the same for applying the friction means;
   means for returning the friction means from an actuated position to a release position;
   a first friction plate torsionally associated with the rotor;
   a second friction plate for selective mating with the first friction plate, torsionally fixed with respect to the rotor;
   a parking brake actuator;
   a parking brake shaft powered separately from the friction means electric motor for rotation by the parking brake actuator;
   cam means associated with at least one of the friction plates and the parking brake shaft whereby rotation of the shaft translates into relative motion between the friction plates to position the same together to lock the vehicle brake or release the same from one another to or release the vehicle brake.

2. An apparatus as described in claim 1 wherein the parking brake actuator is an electric motor.

3. A wheel brake as described in claim 1 wherein said cam means has an overcenter position wherein said cam means will cause the first and second friction plates to be positioned separate from one another without further input from the parking brake actuator.

4. A vehicle brake having an electrically powered actuator for moving a friction means into contact with the vehicle wheel, the brake comprising:
   an electric motor with a rotor torsionally associated with the actuator to power the same for applying the friction means;
   means for returning the friction means from an actuated position to a release position;
   a first friction plate torsionally associated with the rotor;
   a second friction plate for selective mating with the first friction plate torsionally fixed with respect to the rotor and spring biased towards the first friction plate, the second friction plate having an alpha cam surface;
   a parking brake shaft rotatably mounted with a beta cam surface for mating with the alpha cam surface;
   powered means separate from the friction means electric motor to rotate the parking brake shaft to cause the cam surfaces to rotate with respect to one another, causing the first and second friction plates to contact locking or to separate releasing the vehicle brake.

* * * * *